United States Patent

Cassano et al.

[15] 3,640,614
[45] Feb. 8, 1972

[54] FILM SUPPORT AND TRANSPORT APPARATUS

[72] Inventors: James R. Cassano, Penfield; Charles E. Smith, Webster; Robert E. Kalvitis, Fairport, all of N.Y.

[73] Assignee: Xerox Corporation, Rochester, N.Y.

[22] Filed: June 2, 1969

[21] Appl. No.: 829,401

[52] U.S. Cl. ............................................................353/26
[51] Int. Cl. ......................................................G03b 23/12
[58] Field of Search .....................353/25, 26, 74; 352/104

[56] References Cited

UNITED STATES PATENTS

| | | | |
|---|---|---|---|
| Re. 22,517 | 7/1944 | Hopkins | 353/26 |
| 2,381,997 | 8/1945 | Bolsey | 352/104 |
| 3,480,358 | 11/1969 | Brownscombe | 353/26 |

*Primary Examiner*—Leonard Forman
*Assistant Examiner*—A. J. Mirabito
*Attorney*—James J. Ralabate

[57] ABSTRACT

Apparatus for supporting an elongated web of film transparency material in a reel-to-reel arrangement at a projection station in a film viewing device. Film material is selectively transported from one reel to the other past the projection station by both a manual and a powered drive arrangement. The film material is supported for selective positioning at the projection station in a direction transverse to the direction of film travel without interrupting the drive arrangement.

4 Claims, 4 Drawing Figures

FILM SUPPORT AND TRANSPORT APPARATUS

BACKGROUND OF THE INVENTION

This invention relates generally to film-viewing apparatus and more particularly to an arrangement for transporting an elongated web of film transparency material past a projection station in a film-viewing device.

In the past, numerous arrangements have been proposed in which film material in the form of an elongated web is wound from a supply reel onto a takeup reel. When used in conjunction with film-viewing apparatus many of these prior arrangements have assumed unwieldly proportions by being unduly complex in both design and operation. In such arrangements, little consideration has been given toward simplifying the operator function or to a reduction in complexity, yet maintaining a high degree of reliability in operation. In addition, such prior film viewing devices have failed to provide for the input of film transparency materials in a form other than that of an elongated web material.

SUMMARY OF THE INVENTION

Accordingly, it is an object of the present invention to provide an improved arrangement by which film material may be supported at a projection station in a film-viewing device.

It is another object of the present invention to provide an improved arrangement by which film material in the form of an elongated web may be transported from a supply reel past a projection station to a takeup reel in a film-viewing device.

It is still another object of the present invention to provide an improved drive mechanism for feed and takeup reels for a film transport system in a film-viewing device.

It is still another object of the present invention to provide an improved arrangement by which film material in the form of an elongated web may be transported from a supply reel past a projection station to a takeup reel in a film-viewing device through both manual and power operated drive systems.

It is still a further object of the present invention to provide an improved arrangement by which film material in the form of an elongated web is supported at a projection station in a film-viewing device for selective viewing of individual film frames as the film material is advanced from a supply reel at one side of the projection station to a takeup reel at the other side of the projection station and which facilitates selective positioning of the film material within the optical projection path in the transverse direction relative to the direction of film travel without interrupting the drive of the film material from one reel to the other.

It is yet a further object of the present invention to provide an improved reel to reel film transport arrangement for use in a film-viewing device in which the reel to reel film support member may be readily removed from the viewing device without interfering with the optical projection system and the film drive mechanism to accept film materials in a form other than an elongated web.

These and other objects of the present invention are attained by means of a first support member extending in a plane generally normal to the optical path of the projection system in a film-viewing device, first and second drive members journaled for rotation on the first support member, the first and second drive members being spaced on either side of the optical projection system in the direction of film travel, drive means operatively engageable with the first and second drive members for selectively driving the drive members in first and second directions of rotation, a second support member extending in a plane generally parallel to the plane of the first support member, the second support member being slidably mounted on the first support member and movable in a direction generally transverse to the direction of film travel, third and fourth drive members journaled for rotation on the second support member, the third and fourth drive members being spaced on either side of the optical projection system in the direction of film travel to be engaged by the first and second drive members and be respectively driven thereby, first and second spindle shafts operatively supported from the second support member and adapted to respectively receive a supply reel of film and a takeup reel onto which film is to be wound, means operatively connecting the first and second spindle shafts with the respective third and fourth drive members on the second support member to drive the spindle shafts when the drive members are driven, and first and second guide roller means spaced on either side of the optical projection means between the third and fourth drive members for supporting a length of film passing from a supply reel on one of the spindle shafts to the takeup reel on the other of the spindle shafts in a plane substantially normal to the optical path of the projection system.

Other objects of the invention will become readily apparent to those skilled in the art in view of the following detailed disclosure and description thereof, especially when read in conjunction with the accompanying drawings.

DESCRIPTION OF THE PREFERRED EMBODIMENTS

Figure 1:
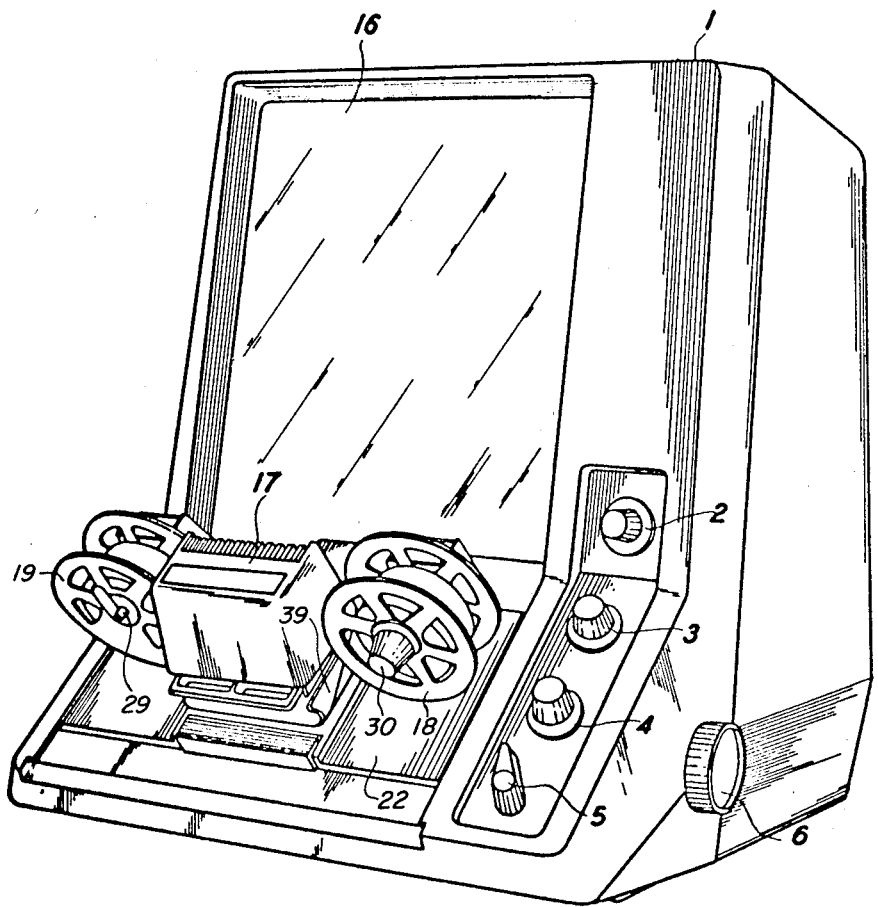
FIG. 1 is a perspective view of a film-viewing device in which the arrangement according to the present invention is particularly adapted for use.

Referring to FIG. 1 of the drawings, there is illustrated a film-viewing apparatus in which the arrangement according to the present invention is particularly adapted for use. As illustrated therein, an elongated web of film transparency material is supported on a supply reel 18 and transported past a projection station located beneath lamp housing 17 to takeup reel 19.

The film-viewing device as illustrated in FIG. 1 includes a brightness control 2 by which the intensity of a projection lamp LMP-1 located within lamp housing 17 may be operatively controlled. Below brightness control 2 is located a film format control 3 the function of which is to selectively change the orientation of the projected image which appears on viewing screen 16 by changing the direction of mirror 13 via lever arm 67, pin 68 and lever arm 69. Successively adjacent film format control 3 is located focus control 4 which operatively controls the positioning of objective lens assembly 12 by means of drive pulleys 71, 73 and 74, and drive chain 72. Located successively adjacent focus control 4 is film transport control 5 which may be selectively positioned to operatively control the drive of supply reel 18 and takeup reel 19 in selected directions of rotation. A manually operated film advance knob 6 is positioned at the right-hand portion of housing 1 to also permit the manual advancing of supply reel 18 and takeup reel 19.

Figure 3:
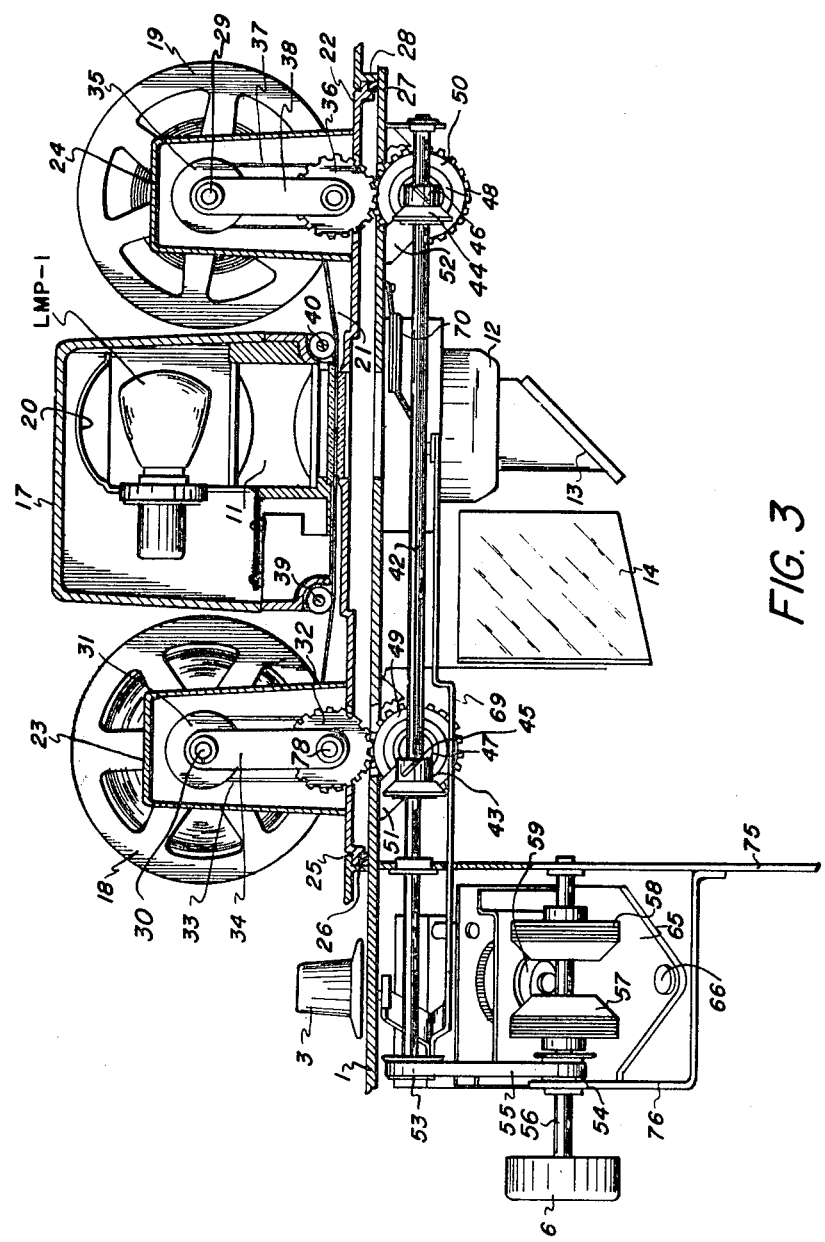
FIG. 3 is a partly broken away sectional view of the film-advancing apparatus as contemplated by the present invention taken along the lines 3—3 of FIG. 2.

As may be seen from FIG. 3, images on film transparency 21 at the projection station are illuminated by means of a projection lamp LMP-1 located within lamp housing 17 which when energized emits radiation which is directed generally downwardly by means of reflector 20. A condensing lens assembly 11 collects and focuses illumination from projection lamp LMP-1 onto the selected film frame on film material 21. An objective lens assembly 12 located beneath the film material 21 at the projection station projects the illuminated image of selected film frames generally downwardly in the optical projection path which is substantially normal to the plane of film material 21. A reflecting member 13 having a highly specular reflective surface thereon is operatively disposed along the optical projection path beneath objective lens assembly 12 to intercept and reflect the projected images of individual film frames according to a first format as selected by film format control 3 onto reflecting member 14 and then onto a third reflecting member (not shown) located within the housing of the viewing apparatus which images are then reflected onto viewing screen 16.

A portion of the drive mechanism of the film transport assembly as contemplated by the present invention is supported inwardly of the housing 1 of the viewing apparatus. As may be seen from FIGS. 3 and 4, gear members 49 and 50 are supported inwardly of housing 1 on opposite sides of the optical projection system by means of support brackets 51 and 52, respectively. Gear members 49 and 50 are rotatably journaled in support brackets 51 and 52 to rotate about axes which extend generally transverse to the direction of film travel. A pair of beveled drive members 47 and 48 are operatively connected to gear members 49 and 50 respectively, to rotate gear members 49 and 50 about the respective axes of rotation. A drive shaft 42 is supported inwardly of housing 1 and is journaled for rotation about an axis extending generally parallel to the direction of film travel. A second pair of beveled drive members 43 and 44 are operatively supported on drive shaft 42 to respectively engage beveled drive members 47 and 48. Beveled drive members 43 and 44 are connected to rotate with drive shaft 42 by means of drive pins 45 and 46 fixed to shaft 42 and which project radially therefrom into slots formed in the hubs of beveled drive members 43 and 44. It will be noted, as may be observed from FIG. 3, the respective slots in beveled drive members 43 and 44 are inclined from the axis of shaft 42 at an angle of approximately 30° in opposite directions from each other for a purpose which will hereinafter become more readily apparent.

A second drive shaft 56 is rotatably journaled in frame plates 75 and 76 below drive shaft 42 and positioned substantially parallel therewith. One end of drive shaft 56 projects through the side of housing 1 to which is connected manually operated film advance knob 6. An endless flexible drive member such as drive belt 55 is entrained about pulley member 53 which is suitably connected to one end of drive shaft 42 and pulley member 54 which is suitably connected to drive shaft 56. Thus belt member 55 operatively connects drive shaft 56 with drive shaft 42 to produce a rotation of drive shaft 42 when drive shaft 56 is rotated.

An induction motor MOT-1 connected to motor support bracket 65 is pivotally supported on frame plate 76 by means of pivot pin 66. The output of motor MOT-1 is operatively connected to rotate beveled drive member 59 in the clockwise direction as viewed in FIG. 3 by means of a spur gear operatively connected to bevel drive member 59 and a spur gear 60 connected to the output shaft of MOT-1 which meshes with spur gear 61.

Motor MOT-1 and bevel drive member 59 are selectively pivoted about pivot pin 68 by means of lever arm 62 which is operatively connected to film transport control knob 5. Lever arm 62 is connected to motor MOT-1 by means of pin 63 connected to a bracket 64 attached to motor MOT-1, the pin 63 being received by a slot located in lever arm 62. As may be seen from FIG. 4, as film transport control knob 5 is rotated in the clockwise direction, motor MOT-1 and bevel drive member 59 will be pivoted about pivot pin 66 in the counterclockwise direction. In a similar manner, as film transport control knob 5 is rotated in the counterclockwise direction as viewed in FIG. 4, motor MOT-1 and bevel drive member 59 will be pivoted in the clockwise direction about pivot pin 66. Motor MOT-1 may be programmed for continuous energization or a switch may be provided which suitably energizes motor MOT-1 via control knob 5.

A pair of beveled drive members 57 and 58 are operatively supported on drive shaft 56 in spaced relationship to each other to be engaged by beveled drive member 59 as motor MOT-1 is selectively positioned by means of film transport control knob 5. In the preferred arrangement, beveled drive members 57 and 58 comprise a beveled frictional resistive surface which is freely rotatably with respect to drive shaft 56.

The hubs of beveled drive members 57 and 58 in the preferred arrangement are connected to drive shaft 56 by means of set screws or other suitable fastening means. Drive between the respective hubs and the friction surfaces of drive members 57 and 58 is obtained by means of a series of friction discs supported between the beveled surfaces of drive members 57 and 58 and the respective hub members. Thus as tension is exerted against drive members 57 and 58 in the axial direction along shaft 56 by means of engagement with beveled drive member 59, the beveled surfaces of drive members 57 and 58 will be held in engagement with the respective hub members via the friction discs to cause shaft 56 to be rotated thereby.

Figure 4:
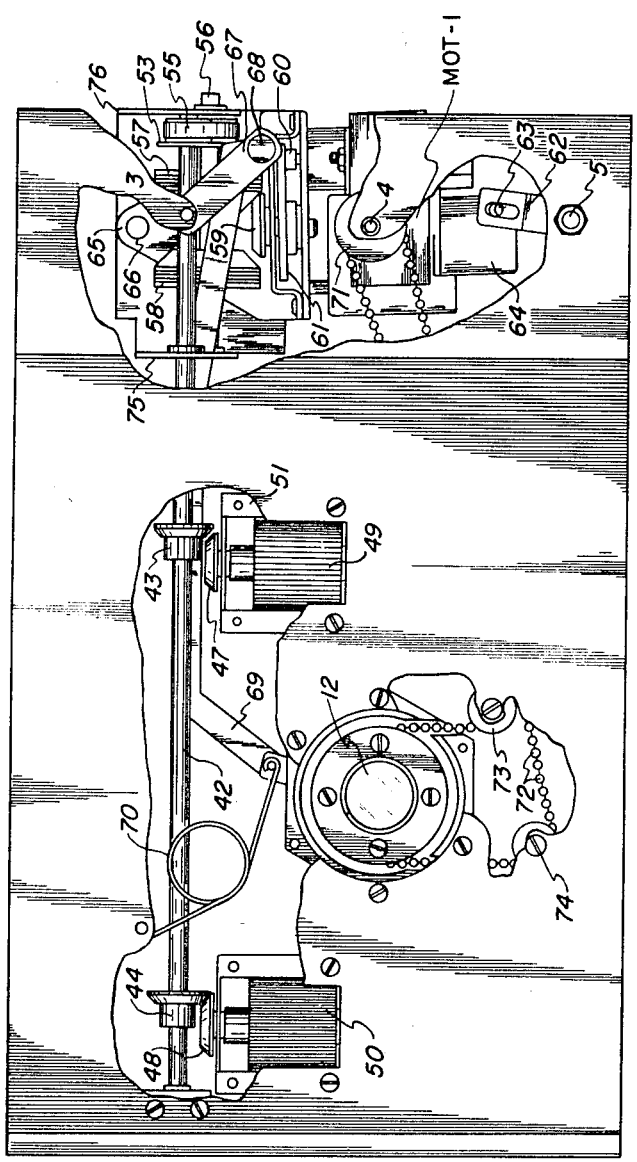
FIG. 4 is a plan view partly broken away showing a portion of the drive train of the film advancing apparatus of FIG. 1.

From this arrangement it should be apparent that as film transport control knob 5 is rotated in the clockwise direction as viewed in FIG. 4, motor MOT-1 and beveled drive member 59 will be pivoted about pivot pin 66 until beveled drive member 59 engages beveled drive member 57. As beveled drive member 59 is rotated in the clockwise direction as viewed in FIG. 3 by means of the gear reduction drive arrangement, drive shaft 56 will be driven in the clockwise direction as viewed in FIG. 2. As drive shaft 56 is driven in the clockwise direction, drive shaft 42 will similarly be driven in the clockwise direction by means of the flexible belt member 55 and pulleys 54 and 53. It should also be apparent that drive shaft 42 may be driven in selected directions of rotation by means of the manually operated film advance knob 6 attached to drive shaft 56.

Figure 2:
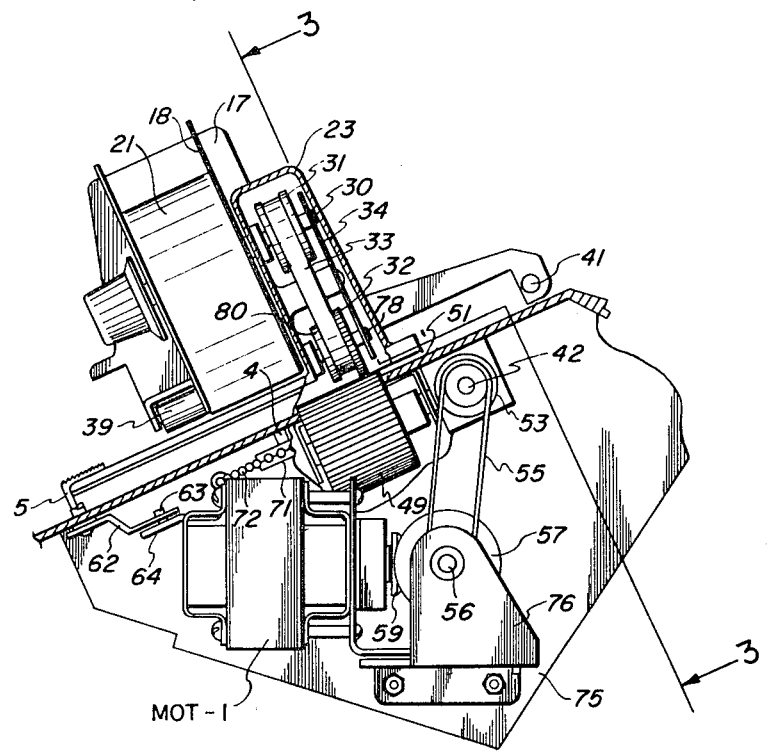
FIG. 2 is a right-hand side elevation showing the film-advancing apparatus of FIG. 1 partly broken away.

As drive shaft 42 is driven in the clockwise direction as viewed in FIG. 2, pin 45 which connects beveled drive member 43 to drive shaft 42 cams beveled drive member 43 in the axial direction along the shaft 42 to the left as viewed in FIG. 3. As beveled drive member 43 is thus axially displaced, beveled drive member 43 is held out of engagement with beveled drive member 47 operatively connected to gear member 49. With the clockwise rotation of shaft 42, pin 46 which connects beveled drive member 44 to drive shaft 42 cams beveled drive member 44 axially along shaft 42 to the right as viewed in FIG. 3 thus engaging the beveled surface of drive member 44 with the beveled surface of drive member 48 on gear member 50. As drive shaft 42 continues to be rotated in the clockwise direction, beveled drive member 44 will be held in engagement with beveled drive member 48 to cause a rotation of gear member 50 in the clockwise direction about the axis of rotation as viewed in FIG. 3.

When drive shaft 42 is driven in the counterclockwise direction as viewed in FIG. 2, beveled drive member 44 will be displaced axially along shaft 42 to the left as viewed in FIG. 3 by means of the pin 46 acting against the slot in beveled drive member 44. Thus, as shaft 42 is rotated in the counterclockwise direction beveled drive member 44 will be supported out of engagement with beveled drive member 48. With drive shaft 42 rotating in the counterclockwise direction as viewed in FIG. 2, beveled drive member 43 will be displaced axially along shaft 42 to the right as viewed in FIG. 3 by means of the pin 45 acting against the slot of beveled drive member 43. Thus as beveled drive member 43 is displaced to the right as viewed in FIG. 3, beveled drive member 43 will be supported in engagement with beveled drive member 47 connected to gear member 49 to thus drive gear member 49 in the counterclockwise direction as viewed in FIG. 3.

The film material 21 which is to be transported from a supply reel 18 to a takeup reel 19 is supported on the viewing apparatus by means of a film support member 22. Film support member 22 is slidably positioned on the housing 1 of the viewer apparatus to be selectively positioned relative to the optical projection path in the direction generally transverse to the direction of film travel. Film support member 22 includes at one lateral edge thereof a tang 25 which mates with a corresponding groove 26 formed in the viewer housing 1. At the other lateral edge thereof a second similar tang 27 mates with a groove 28 formed in viewer housing 1. This arrangement therefore permits a slidable positioning of support member 22 relative to the optical path in the transverse direction relative to the direction of film travel. Film support member 22 centrally thereof includes a flat portion which lies in a plane substantially normal to the optical projection path. An aperture located in film support member 22 is suitably positioned to permit light from projection lamp LMP-1 to pass through condensing lens assembly 11 onto the film transparency material 21 which illuminated images then may be projected along the optical path by means of objective lens assembly 12.

A pair of spindle housings 23 and 24 are connected to film support member 22 on opposite sides of the optical projection path. A pair of spindle shafts 29 and 30 are journaled for rotation in spindle housings 24 and 23, respectively, through bearing plates 34 and 38. Spindle shafts 29 and 30 extend through the front portions of spindle housings 24 and 23 respectively, to receive a supply reel 18 having a quantity of film material 21 thereon and a takeup reel 19 onto which the film material 21 is to be wound. A pair of gear members 32 and 36 are journaled for rotation within spindle housings 23 and 24, respectively, on shafts 77 and 78 supported in bearing plates 38 and 34 respectively. Gear members 32 and 36 extend through suitably arranged openings in film support member 22 to engage and mesh with gear members 49 and 50 respectively. A pair of pulley members 31 and 35 are connected to spindle shafts 30 and 29 respectively. A pair of pulley members 79 and 80 are connected to gear members 32 and 36 respectively on shafts 77 and 78. Endless flexible drive members 33 and 37 are respectively entrained about pulley members 31, 80, 35 and 79, respectively, to rotate spindle shafts 29 and 30 when the respectively associated gear members 32 and 36 are rotated.

Film material 21 passing from supply reel 18 passes between lamp housing 17 and film support member 22 over a first roller member 39 connected to lamp housing 17, then through the optical projection path and past a second rotatable roller member 40 connected to lamp housing 17 spaced on the opposite side of the projection path in the direction of film travel from roller member 39. From roller member 40, the film material 21 passes to takeup reel 19 to which the film material is to be wound. From this arrangement it will be apparent that as gear member 50 is rotated in the clockwise direction, as viewed in FIG. 3, gear member 36 will be rotated in the counterclockwise direction, with spindle shaft 29 being rotated in the counterclockwise direction via belt member 37 thus rotating takeup reel 19 in the counterclockwise direction to wind film material 21 from supply reel 18 onto takeup reel 19.

In a similar manner, as gear member 49 is rotated in the counterclockwise direction as viewed in FIG. 3, gear member 32 will be rotated in the clockwise direction with spindle shaft 30 being rotated in the clockwise direction via belt member 33 thus rotating supply reel 19 in the clockwise direction to wind film material 21 from takeup reel 19 onto supply reel 18. From this arrangement, film material 21 may be advanced past the projection station from supply reel 18 onto takeup reel 19 and then reversed by winding the film material from takeup reel 19 back onto supply reel 18.

Lamp housing 17 with roller members 39 and 40 rotatably connected thereto is pivotally supported on the viewer housing 1 by means of pivot pin 41 as may be seen from FIG. 2. Thus in placing film material on the viewing apparatus, lamp housing 17 is pivoted to an upright position and a supply reel 18 having film material 21 thereon is inserted onto the spindle shaft 30 and the web of film material is threaded onto takeup reel 19. With the film material 21 extending across the optical projection path, the lamp housing 17 may be pivoted about pivot pin 41 to the lowered position as shown in FIG. 2 with roller members 39 and 40 engaging the web material 21 extending between supply reel 18 and takeup reel 19 and supporting the web of film material 21 in a plane generally normal to the optical projection path.

It will be appreciated that as a result of the slidable arrangement between film support member 22 and viewer housing 1, the film material supported across the optical projection path may be selectively positioned within the optical projection path in a direction transverse to the direction of film travel. As film support member 22 is thus positioned relative to the viewer housing 1, gear members 32 and 36 are free to move along the axial length of gear members 49 and 50 respectively, without interrupting the drive connection to supply reel 18 and takeup reel 19. From this arrangement it will therefore be appreciated that the film transport apparatus as contemplated by the present invention provides a highly versatile arrangement for transporting a quantity of film material past an optical projection station and permits the selective positioning of individual film frames in relation to the optical projection path without interrupting the drive imparted to the film material 21. This therefore permits adjustments in the location of the images on viewing screen 16 without interrupting the film drive.

As a further feature of the film transport mechanism as contemplated by the present invention it will be appreciated that the film support member 22 may be removed from the viewer housing 1 by means of sliding the film support member 22 out of the grooves 26 and 28 at the front of the viewer housing 1. Thus with the film support member 22 removed from the machine it is possible to utilize film materials in a form other than an elongated web. That is, by removing film support member 22 from the machine, film transparency materials in the form of aperture cards, microfiche, etc., may be supported at the projection station without interference from a reel to reel transport mechanism.

While the invention has been described with reference to a preferred arrangement, it will be generally understood by those skilled in the art that various changes may be made and equivalents may be substituted for elements thereof without departing from the true spirit and scope of the invention.

What is claimed is:

1. Apparatus for transporting an elongated web of film transparency material past a projection station in a film-viewing device comprising, first and second gear members spaced from each other on opposite sides of said projection station adapted for rotation about axes extending generally transverse to the direction of film travel, a drive shaft journaled for rotation about an axis extending generally parallel to the direction of film travel, first and second drive members respectively associated with said first and second gear members for rotating said gear members about the respective axes thereof, third and fourth drive members supported on said drive shaft and respectively engageable with said first and said second drive members for driving said first gear member in a first direction of rotation and said second gear member in a second direction of rotation, drive means operatively associated with said drive shaft for selectively rotating said shaft in first and second directions of rotation, means respectively associated with said drive shaft and said third and fourth drive members for engaging said third drive member with said first drive member when said shaft is rotated in a first direction and for engaging said fourth drive member with said second drive member when said shaft is rotated in a second direction, a film support member having an opening therein in communication with said projection station, first and second spindle shafts mounted in spaced relationship to each other on said film support member and adapted for rotation about axes extending generally parallel with the axes of rotation of said first and second roller members, guide means for supporting a length of film extending from a supply reel on one of said spindle shafts onto a takeup reel on the other of said spindle shafts in a plane generally normal to the optical path at said projection station, means slidably mounting said film support member on said housing member for selectively positioning said film transparency web in said optical path in a direction transverse to the direction of film travel, drive means operatively associated with each of said first and second spindle shafts on said film support member for respective engagement with said first and said second gear members and adapted to drive said supply reel and said takeup reel in selected directions of rotation as said support member with the film material thereon is selectively positioned in relation to said optical path, and said third and fourth drive member engaging means each including, a pin member connected to said drive shaft and projecting radially outwardly therefrom, and a slot formed in said drive members for receiving said pin member connected to said shaft, said slot being inclined at an angle from the axis of said shaft to produce a limited axial displacement of said drive member along said shaft as said shaft is rotated.

2. Apparatus for transporting an elongated web of film transparency material past a projection station in a film-viewing device comprising, first and second gear members spaced from each other on opposite sides of said projection station adapted for rotation about axes extending generally transverse to the direction of film travel, a drive shaft journaled for rotation about an axis extending generally parallel to the direction of film travel, first and second drive members respectively associated with said first and second gear members for rotating said gear members about the respective axes thereof, third and fourth drive members supported on said drive shaft and respectively engageable with said first and said second drive members for driving said first gear member in a first direction of rotation and said second gear member in a second direction of rotation, drive means operatively associated with said drive shaft for selectively rotating said shaft in first and second directions of rotation, means respectively associated with said drive shaft and said third and fourth drive members for engaging said third drive member with said first drive member when said shaft is rotated in a first direction and for engaging said fourth drive member with said second drive member when said shaft is rotated in a second direction, a film support member having an opening therein in communication with said projection station, first and second spindle shafts mounted in spaced relationship to each other on said film support member and adapted for rotation about axes extending generally parallel with the axes of rotation of said first and second roller members, guide means for supporting a length of film extending from a supply reel on one of said spindle shafts onto a takeup reel on the other of said spindle shafts in a plane generally normal to the optical path at said projection station, means slidably mounting said film support member on said housing member for selectively positioning said film transparency web in said optical path in a direction transverse to the direction of film travel, drive means operatively associated with each of said first and second spindle shafts on said film support member for respective engagement with said first and said second gear members and adapted to drive said supply reel and said takeup reel in selected directions of rotation as said support member with the film material thereon is selectively positioned in relation to said optical path, and said third and fourth drive member engaging means each including, a pin member connected to said drive shaft and projecting radially outwardly therefrom, and a slot formed in said drive members for receiving said pin member connected to said shaft, said slot being inclined at an angle from the axis of said shaft to produce a limited axial displacement of said drive member along said shaft as said shaft is rotated, and said drive shaft rotating means including, a second drive shaft operatively connected with said first drive shaft for rotating said first drive shaft in selected directions of rotation, a pair of friction drive members operatively supported on said second drive shaft in spaced relation to each other, an electrical motor means having a friction drive member connected to the output shaft thereof for rotation in a predetermined direction of rotation, and means for selectively pivoting said motor means between first and second positions to respectively engage said friction drive member on the output shaft of said motor means with the respective friction drive members on said second drive shaft to selectively drive said second drive shaft in opposite directions of rotation.

3. In a film-viewing device, apparatus for transporting an elongated web of film transparency material past a projection station comprising in combination, a housing member associated with said film-viewing device and having optical projection means adjacent a projection station at which images of said film transparency web are projected along an optical path onto a viewing screen, means operatively associated with said housing member for illuminating images of said film transparency web at said projection station, a film support member positioned intermediate said optical projection means and said illumination means and having an opening therein in communication with said projection means and said illumination means, first and second gear members spaced from each other on opposite sides of said projection station and supported inwardly of said housing member for rotation about axes extending generally transverse to the direction of film travel, said gear members having a peripheral portion of which extends outwardly through said housing member, a drive shaft supported inwardly of said housing member and journaled for rotation about an axis extending generally parallel to the direction of film travel, first and second drive members respectively associated with said first and second gear members for rotating said gear members about the respective axes thereof, third and fourth drive members supported on said drive shaft and respectively engageable with said first and said second drive members for driving said first gear member in a first direction of rotation and said second member in a second direction of rotation, drive means operatively associated with said drive shaft for selectively rotating said shaft in first and second directions of rotation, means respectively associated with said drive shaft and said third and fourth drive members for engaging said third drive member with said first drive member when said shaft is rotated in a first direction and for engaging said fourth drive member with said second drive member when said shaft is rotated in a second direction, first and second spindle shafts mounted in spaced relationship to each other on said film support member and adapted to respectively receive a supply reel of film and a takeup reel onto which film is to be wound, said spindle shafts being adapted for rotation about axes extending generally parallel with the axes of rotation of said first and second gear members, guide roller means operatively associated with said image illumination means and said housing member for supporting a length of film extending from said supply reel onto said takeup reel in a plane generally normal to the optical path between said image illumination means and said optical projection means, means slidably mounting said film support member on said housing member for selectively positioning said film transparency web in said optical path in a direction transverse to the direction of film travel, drive means operatively associated with each of said first and said second spindle shafts on said film support member for respective engagement with said first and said second gear members and adapted to drive said supply reel and said takeup reel in selected directions of rotation as said support member with the film material thereon is selectively positioned in relation to said optical path, and said third and fourth drive member engaging means each including, a pin member connected to said drive shaft and projecting radially outwardly therefrom, and a slot formed in said drive members for receiving said pin member connected to said shaft, said slot being inclined at an angle from the axis of said shaft to produce a limited axial displacement of said drive member along said shaft as said shaft is rotated.

4. Apparatus according to claim 3, said drive shaft rotating means including, a second drive shaft operatively connected with said first drive shaft for rotating said first drive shaft in selected directions of rotation, a pair of friction drive members operatively supported on said second drive shaft in spaced relation to each other, an electrical motor means having a friction drive member connected to the output shaft thereof for rotation in a predetermined direction of rotation, and means for selectively pivoting said motor means between first and second positions to respectively engage said friction drive member on the output shaft of said motor means with the respective friction drive members on said second drive shaft to selectively drive said second drive shaft in opposite directions of rotation.

* * * * *